US005743745A

United States Patent [19]

Reintjes

[11] Patent Number: 5,743,745

[45] Date of Patent: Apr. 28, 1998

[54] DEVICE FOR PLAYING BACK SHORT FILMS AND/OR ADVERTISING SPOTS AND/OR QUIZ QUESTIONS

[76] Inventor: Wilhelm Reintjes, Alpener Strasse 52, 47665 Sonsbeck, Germany

[21] Appl. No.: 762,796

[22] Filed: Dec. 9, 1996

Related U.S. Application Data

[63] Continuation of Ser. No. 297,942, Aug. 31, 1994, abandoned.

[51] Int. Cl.[6] .................. A63F 9/18; G09B 9/00

[52] U.S. Cl. .................. 434/307; 358/903; 273/430

[58] Field of Search .................. 434/169, 185, 434/322, 323, 350, 362, 307 R, 308; 358/903, 84; 273/429, 430

[56] References Cited

U.S. PATENT DOCUMENTS

| | | | |
|---|---|---|---|
| 4,422,105 | 12/1983 | Rodesch et al. | 358/903 |
| 4,593,904 | 6/1986 | Graves | 273/430 |
| 5,034,807 | 7/1991 | Von Kohorn | 358/84 |
| 5,108,115 | 4/1992 | Berman et al. | 273/430 |
| 5,180,309 | 1/1993 | Egnor | 273/430 |
| 5,271,626 | 12/1993 | Llenas et al. | 273/430 |
| 5,441,414 | 8/1995 | Chretien | 434/307 R |

FOREIGN PATENT DOCUMENTS

| | | |
|---|---|---|
| 0338936 | 10/1989 | European Pat. Off. . |
| 0570878 | 11/1993 | European Pat. Off. . |
| 2311369 | 12/1976 | France . |

OTHER PUBLICATIONS

International Patent Pub. WO 92/02920 to Dieter Knoch entitled, "Customer Information Terminal for Sales Areas" dated 20 Feb. 1992.

*Primary Examiner*—Stephen R. Crow

*Attorney, Agent, or Firm*—Watson Cole Stevens Davis, P.L.L.C.

[57] ABSTRACT

Method for presenting short films, whereby short films during or in between which at least one quiz question is to be inserted, the short films are stored, and at least one quiz question and the correct answer are inserted during or in between the short films, answers to the quiz question are entered for comparison of the entered answer with the stored, correct answer. The winners of the quiz game are determined by a storage device, the storage device being controlled by the input device. After entry of the correct answer into the input device, a display is divided into fields for the presentation of the individual consumer goods, the winning certificates of the selected supplier are printed out. After pressing a play key, a prompt for the player appears on the screen and after choosing the correct answer, the player is requested to choose between two envelopes which are displayed on the screen. The player is requested to provide personal information, and a winning certificate for the player is printed out after this information has been provided.

8 Claims, 1 Drawing Sheet

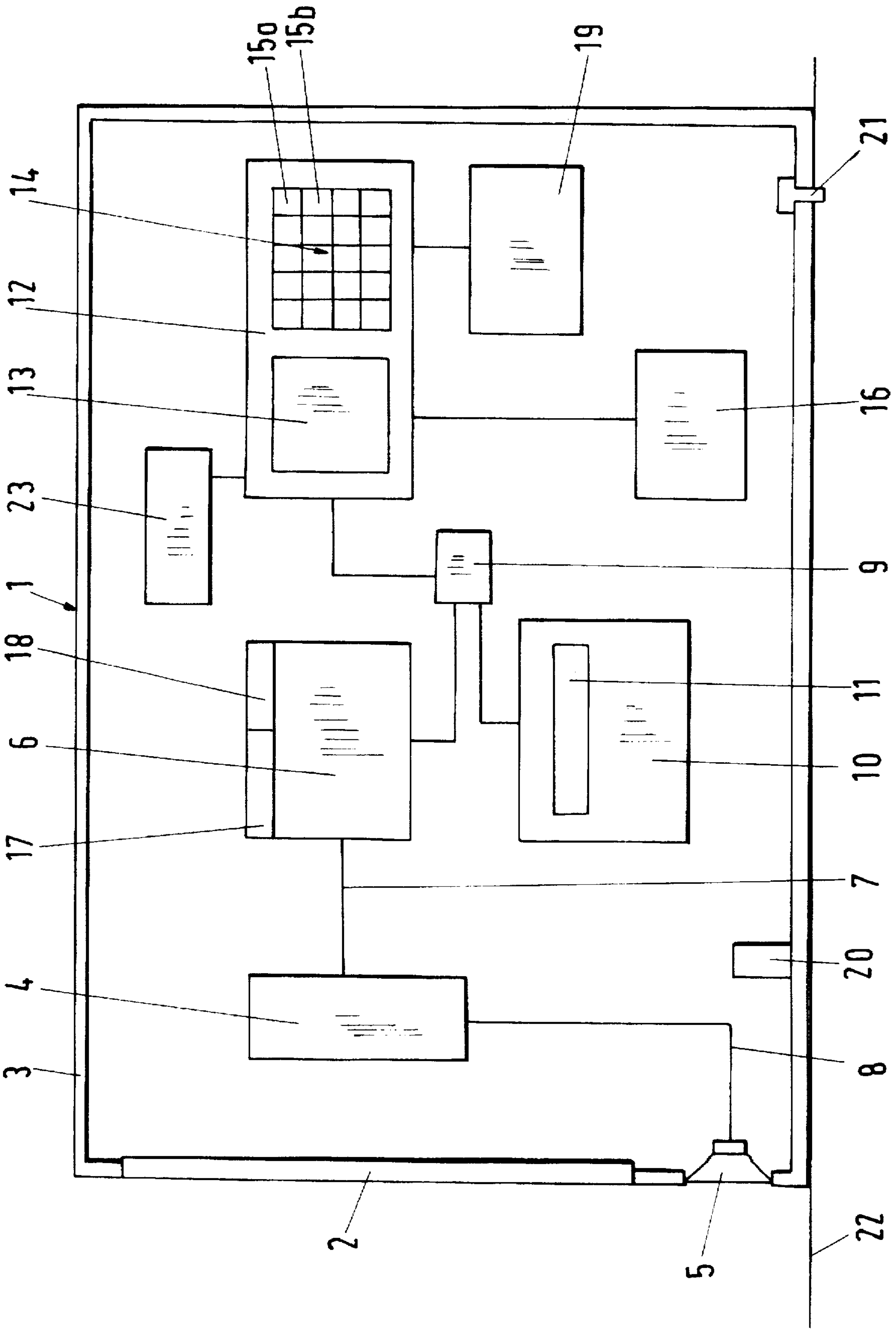
15a
15b
19
21
14
12
13
16
23
9
1
18
11
6
10
17
7
20
4
8
3
2
5
22

DEVICE FOR PLAYING BACK SHORT FILMS AND/OR ADVERTISING SPOTS AND/OR QUIZ QUESTIONS

CROSS-REFERENCE TO RELATED APPLICATION

This is a continuation of application Ser. No. 08/297,942, filed Aug. 31, 1994, now abandoned.

BACKGROUND OF THE INVENTION

The invention relates to a device for playing back short films and/or advertising spots and/or quiz questions, in particular in stores, recreational centers and establishments providing food, drink and entertainment, for example discotheques.

Devices for playing back short films and/or quiz questions are well-known. They are usually television sets, in front of which the viewers at home, in restaurants, in hotel rooms, etc., sit and watch the advertising television or public events or also educational broadcasts with quiz questions or competition riddles, where quiz questions are inserted into the advertising spots or between the advertising spots or light entertainment programs. The television viewer generally writes the answer which he thinks is correct on a postcard and mails it to one of the television stations, which then determines the winner(s).

It is also well-known to air such quiz questions during public television shows; they are then also answered via the postal system and the winner(s) is/are determined in the same manner.

Furthermore, it is known that during such broadcasts the viewers give their address and answer by telephone, whereby the goal is primarily to be the first caller.

Such events are associated with high investment cost, require a significant financial cost so that for many persons engaged in a business the cost for advertising is too high. In particular the insertion of quiz questions, which support the advertising effect, is for this reason out of the question for them.

Moreover, such events, especially if they form the framework or insertion into a light entertainment program, assume suitable sales, the appearance of artists, etc., so that the viewers or participants show great interest or great interest is produced in the viewers or participants, especially since these events are supposed to generate supra-regional attention.

In many cases especially smaller businesses are interested only in regional advertising, since the necessary business structure and also a corresponding fleet is not available to make supra-regional deliveries to the market, in particular there is no transport across the borders.

An audiovisual advertising medium with a perpendicular carrier frame, which is anchored in the ground, is known from the DE 38 38 775. A box-shaped protective housing for holding a color television monitor and at least two videorecorders is fitted into the upper region of the carrier frame. Furthermore, underneath there is a display case insert, which can be replaced by a luminous transport insert or a vending machine. Thus, a relatively inexpensive advertising medium is created with which small and medium size businesses can advertise directly and effectively, thus drawing the attention of a larger peripheral audience to their activities.

SUMMARY OF THE INVENTION

The invention is based on the problem of providing a device for playing back short films and/or advertising spots and/or quiz questions and/or answers, which allow selective regional or supra-regional advertising with great advertising effect and which can be installed especially in stores, entertainment centers and establishments providing food, drink and entertainment, in particular discotheques.

This problem is solved by means of a device for playing back short films and/or advertising spots and/or quiz questions, in particular in stores, entertainment centers and establishments providing food, drink and entertainment, for example discotheques, comprising a) at least one projection wall for presenting short films and/or advertising spots and/or at least one quiz question, which is to be inserted in or between, and/or at least one answer, b) a projecting device (projector) for projecting short films and/or advertising spots and/or the quiz question (s), which is/are to be inserted in or between, and/or answers, c) an acoustical device (loudspeaker) for playing back the sound added to the short films and/or the advertising spots and/or the quiz question(s), d) a memory device (videorecorder) for storing the short films and/or advertising spots and at least one quiz question, which is to be inserted optically and/or acoustically into or between the short films and/or advertising spots, and the correct answer, e) an input device with keyboard for entering the answers to the quiz question with an additional device for comparing the answer with the stored, correct answer, f) a memory device with a programmable memory, which determines the winners of the quiz game and which can be expanded for individual consumer goods and/or services to be offered and display of the addresses of their suppliers; said memory device being enabled by the input device following input of the correct answer into said input device, g) a division of a display into fields (15*a*, 15*b*. . . ) for presenting the individual consumer goods and/or services and/or display of the addresses of the suppliers, h) a printer for printing out the winning certificates or the selected supplier or as a receipt for more information to be obtained from the supplier, and i) a recorder for speech, which digitizes the recorded speech and stores it so that it can be polled, whereby, moreover, j) two different image protectors, which invite the viewer to play, appear on the display screen, when no one is playing with the device, k) following depression of a playing key, the screen asks the player a question, upon which the player is supposed to find the answer that he deems to be correct from a plurality of existing answers to the question, l) if the player has selected the correct answer, the player is requested to choose between two envelopes, which are shown on the screen and of which only one envelope contains a purchase coupon, m) if the player has chosen the envelope with the purchase coupon, the player is requested to give information concerning his person, for example, postal area code of his place of residence and his date of birth and n) after these data have been given, a winning certificate is printed out for the player.

Furthermore, there is the possibility of expanding the sequence and of requesting information, prospectuses, or consultation to be obtained from the supplier.

Within the scope of the invention suitable presentation places are stores, such as self-service warehouses, department stores, construction markets and the like, moreover, amusement parks, amusement spas, indoor pools, bowling alleys, athletic grounds such as football facilities and similar facilities for competitive games, lobbies in hotels, in vacation hotels, waiting rooms in train stations, rest sites and objects of entertainment gastronomy and the like, where the user or the visitor of these facilities can see and hear short films and/or advertising spots with quiz questions for relaxation or as additional shopping and leisure-time pleasure or for entertainment, whereby to raise the interest and to enhance the advertising effect quiz questions are solved that are a part of these short films and/or advertising spots or part of the consequence of these short films or advertising spots and immediately actively engage the viewer in a quiz game.

By means of these measures a device is provided that is also of interest for small businesses for local advertising owing to the relatively low cost of advertising, wherein one or multiple devices according to the invention can be used simultaneously for advertising that covers one area, so that a large area, supra-regional advertising campaign can also be conducted, whose area is predetermined by the number of devices which are used and exhibit the invention.

All devices can play back or beam out in the same sequence the same number of short films and/or advertising spots and/or quiz questions and/or answers.

While the number of short films and/or advertising spots and/or quiz questions and/or answers is the same, their sequence can be modified.

Moreover, it is possible to account for regional features and advertise, for example, sail boats and surf courses in costal regions in the summer, whereas hiking and suitable outfits and overnighting are advertised in the forested inland.

Thus, the device, according to the invention, permits a differentiated and targeted advertising depending on the regional pecularities, a feature that could not be offered by advertising television in this range of variation—owing to the costs alone.

Suitable projection walls are the conventional projection walls for large picture projections, where their dimensions are chosen with respect to the size of the objects to be presented. In this manner the user or viewer has the impression that he is participating in a live broadcast.

The device for projecting short films and/or advertising spots and/or quiz questions, which may or may not be inserted in or between, and/or answers can be a projector, whereby then the short films and/or advertising spots and quiz questions form a sound film.

This device can also be in principle a device with an image storage, or designed according to the principle of a CD disk playback device, where all information—both the optical and the acoustical information—is stored on a video disk or on a CD disk and are scanned with a laser beam or a semi-laser beam, whose information is processed or prepared accordingly and is then projected in the well-known manner as optical information or emitted as acoustical information via loudspeakers.

The acoustical device for reproducing the scoring of the short films and/or the advertising spots and optionally the sound added to the quiz question exhibits at least one sound transducer (loudspeaker), which emits the acoustical signals.

According to a first preferred embodiment of the invention, the device for storing at least one quiz question, which is to be inserted optically and/or acoustically into or between the short films and/or the advertising spots, and the correct answer is a device, which functions according to the principle of a videorecorder and which exhibits suitable outputs for the optical signals and the acoustical signals.

Said device can also exhibit in principle a tape for adding the sound, whereas, to insert the optical signals in or between, there is a short film or a short insert (silent film), which is projected on the projection wall.

Thus, according to the invention in another embodiment of the invention these devices for storing the short films and/or advertising spots and/or the quiz question(s) to be inserted in or between and/or the answers can be combined into one single device, which functions according to the principle of the video recorder and to which at least one loudspeaker is attached and the images are projected on a projection wall (background projection).

Furthermore, the device, according to the invention, exhibits a device with keyboard for entering the answers to the quiz question and information of the quiz participant, and an additional device for comparing an entered answer with the stored correct answer. This is done expediently with the aid of special software.

Said device is followed by another device, which is enabled by said former device when the correct answer has been entered. This additional device functions according to the principle of an AND element.

According to the invention, another device exhibits a programmable memory, which determines the winners of the quiz game according to the predetermined criteria, and a display. The memory can be expanded for individual consumer goods and/or services to be offered and for the addresses and names of their suppliers.

The display can serve for additional presentation of individual consumer goods and/or services and/or for displaying the addresses of suppliers and is subdivided preferably into individual fields. There is no subdivision when several displays are present.

In addition, the device according to the invention exhibits a printer for printing out the winning certificates or the address of the selected supplier as a receipt for more information to be obtained and optionally also for printing out the route from the current location to the supplier.

According to a preferred embodiment, the memory device, the input device with keyboard and the memory device form a data processing system or parts of a data processing system. The content of the short films, the advertising spots and the quiz questions and the solutions, answers and data, which can be stored on disks or on other data mediums, are entered into the system, supplemented, modified or deleted.

In another embodiment of the invention, the device exhibits a device for specifying the sequence of short films and/or advertising spots. With these measures it is possible to modify the rigid sequence of the entire program, which comprises the short films, the advertising spots and quiz question(s) and solutions.

Expediently the device also exhibits a device for specifying the sequence and/or insertion of the quiz questions.

The device can be designed in such a manner that it exhibits an auxiliary device for printing, as desired, visiting cards and/or letter heads when the correct answer is entered, so that the visitors pay more attention to the device according to the invention.

According to an advantageous embodiment of the invention, the fields of the display can be designed according to the principle of sensor keys, so that its susceptability to failure is significantly reduced compared to mechanical contacts. This design is of special interest, for example, in indoor pools in order to avoid, if possible, corrosion.

The device is housed expediently in a protective housing, so that it is largely protected from mechanical influences and access by third parties.

The protective housing can also exhibit an alarm mechanism against unauthorized opening and/or removal of the device from its location, so that unauthorized access to the stored data, in particular the addresses of the suppliers is eliminated. The alarm mechanism can send optical and/or acoustical signals; it can also be connected to a central monitoring office.

In addition, the device according to the invention can exhibit a device with a program, which blocks or erases the stored data when the device is opened by unauthorized persons.

Expediently the device can be locked to its location, so that unauthorized removal of the device from its location is virtually impossible.

BRIEF DESCRIPTION OF THE FIGURE

The invention is explained below with reference to one of the embodiments shown in the drawing, which shows a block diagram of the device, which exhibits the invention and which is then also applicable when for the storage and the playback of the data the device according to the invention is designed according to the principle of a data processing system. The drawing is a vertical view of the device perpendicular to the front wall of the housing of the device.

DETAILED DESCRIPTION OF THE PREFERRED EMBODIMENT

A device 1 exhibits a projection wall 2, which is put into the front wall of a housing 3 and on whose side facing the viewer the optical information representing the short films and/or the advertising films or advertising spots and/or quiz questions and/or answers are projected with a mirror (not illustrated) according to the principle of deflection from the interior of the housing 3 by means of a device for projecting short films and/or advertising spots and/or quiz questions to be inserted in or between.

Multiple loudspeakers 5, which emit the acoustical information, are arranged below the projection wall 2.

In the illustrated embodiment the device 4 is designed according to the principle of a film projector. In this case it includes at least one roll of film or a video disk with the sequential short films, the advertising spots and the quiz question(s) and/or answers, whereby the signals of the sound track are fed to the loudspeaker 5 over the connecting line 8.

The data representing the short films, the advertising spots, the quiz question(s) and/or solutions and the correct answer(s) are stored in a device, which functions in the well-known manner according to the principle of the videorecorder and sends the stored optical and acoustical information to the device 4 via a line 7.

The device 4 functions according to the principle of a beamer.

The optical signals are converted and the images it represents are projected on the projection wall 2 via a mirror (not illustrated) according to the principle of deflection and according to the principle of the rear wall projection.

The input of the device 4 is connected via the line 7 to an output of the device 6, which exhibits in essence a data storage for storing the short films, the advertising films, the quiz question(s) and/or solutions and the correct answer(s), whereby the data representing the optical signals queue via this output, whereas data representing the acoustical signals are fed to the loudspeakers 5 through an amplifier (not illustrated) with controller via an output over the line 8 of the device 4.

The data to be stored can also be stored, for example, by means of diskettes in the device 6, which also exhibits a clock that determines the timing.

The device 6 exhibits another output, which is connected to an input of an auxiliary device 9, which functions according to the principle of an AND element and which exhibits a second input.

This other input of the auxiliary device 9 is connected to an output of another device 10, which exhibits a keyboard 11 for entering an answer or the answer(s) to the quiz question (s) and the information of the quiz participant.

The auxiliary device 9 compares the entered answer(s) with the stored correct solution(s) and, when the entered answer(s) agree(s) with the stored solution(s), enables the following additional device 12.

This additional device 12 exhibits a programmable memory 13, which determines the winners of the quiz game according to predetermimed criteria, and a display 14. The memory 13 can be expanded for individual consumer goods and/or services to be offered and their manufacturers or suppliers. Suitable displays 14 are also conventional display screens.

The display is subdivided into fields 15*a*, 15*b*, . . . for the presentation of individual consumer goods and/or services and/or for the display of addresses of suppliers.

The additional device 12 is followed by a printer 16 for printing the winning certificates or the selected supplier or as a receipt for additional information to be obtained from the manufacturer or supplier.

The device 6 includes a device 17 for specifying the sequence of the short films and/or the advertising spots and a device 18 for specifying the sequence and/or insertion of quiz question(s) and/or answers.

Furthermore, the additional device 12 can be followed by an auxiliary device 19 for printing, upon demand, visiting cards and/or letter stationary designed as desired when the correct answer(s) is/are entered.

Furthermore, the device is arranged in a protective housing, which enables the installation of an alarm mechanism 20 against unauthorized opening and/or unauthorized removal of the device 1 from its location 22.

To store data, the device 6 includes an integrated device with a program, which blocks or erases the stored data when the device 1 is opened by unauthorized persons.

For more protection against theft, the housing of the device can be locked to its location by providing a barrier 21, which can be locked to the location 22, according to the principle of the unlockable barrier bars, which are customary in street traffic.

Furthermore, the device according to the invention can also be put into hospitals and health resorts.

When the correct answer is entered, a winning number can also be printed out for participation in a special lottery.

The result of the deflection system in connection with the rearwall projection is, according to the invention, a compact, space saving device, in which all of the components are housed centrally.

Connected to the storage 13 is a recorder 23, which intended for speech and which digitizes the speech and can store speech so that it can be polled.

Furthermore, a device is provided that can also be set up in regions with high humidity, such as indoor pools, solariums, etc.

If the device has no players, two pictures or inscriptions, which invite the visitor, viewing the short films on the projection screen, to participate in the quiz game, alternate on the display screen in order to protect the display screen. In so doing, the keyboard, which comprises in the present case only one keyboard ball, is to be actuated. Thus, the visitor or player can get on the video screen one answer, which appears correct to him, from a number of solutions. Finally a text, which informs the player whether he entered the wrong or the correct answer, appears on the display screen. If he entered the wrong answer, the game is terminated.

If, however, the player entered the appropriate answer, a picture with two envelopes, e.g. letter envelopes, appears on the display screen, whereby one of the two envelopes contains a purchase coupon, whereas the other letter envelope is empty. The player is requested to select one of the two envelopes on the screen.

If the player chooses the empty envelope, he is informed that the game has ended.

If, however, the player has selected the envelope with the purchase coupon, the screen reports to the player that he has won the purchase coupon. Finally the screen asks the player to give biographical data, for example the postal routing code of his residence and his date of birth.

Finally a product or company related coupon is printed out, with which the winner can acquire a specific product at no cost or at a discount.

If it is determined by entering the date of birth that the player has not reached the required minimum age according to the conditions of participation, the display screen informs the player that the game has ended and gives the above reason.

If the player has already won for the fourth time within the same month, the screen informs the player that the game has ended and gives the above reason that he may win only three times per month according to the conditions of participation.

I claim:

1. Method for presenting visual images selected from the group consisting of short films, advertising spots and quiz questions, in particular at sales outlets, leisure facilities and locations belonging to the entertainment and catering sector, such as discotheques, including the steps of:

a) presenting at least one of short films and advertising spots, during or in between which at least one quiz question or at least one answer is to be inserted, on at least one projection screen, b) projecting short films or advertising spots with the quiz question or quiz questions to be inserted on the screen during or in between the films, advertising spots or the answers by a projecting device, c) playing a sound recording which accompanies the short films, the advertising spots or the quiz question or quiz questions through an acoustic device, d) storing the short films or the advertising spots by means of a storage device (video recorder), and inserting at least one quiz question and the correct answer optically or acoustically during or in between the short films or advertising spots, e) entering answers to the quiz question with an additional device which enables comparison of the entered answer with the stored, correct answer, f) determining winners of the quiz game by means of a storage device with a programmable memory, and the memory can be expanded to incorporate individual consumer goods to be offered or services, or displays of the addresses of the suppliers of these goods or services, said storage device being controlled by the input device, after entry of the correct answer into the latter, g) dividing a display into fields for presentation of the individual consumer goods or services or the suppliers' addresses, h) printing out the winning certificates or the selected supplier or a receipt for further information to be obtained from the supplier, i) digitalizing recorded speech for recall from the memory, j) alternately displaying from two different display projectors invitations to play on the screen when no player is using the device, k) after pressing a play key, a prompt for the player appears on the screen, after which the player is required to select the answer which he considers to be correct from a large number of possible answers, l) after choosing the correct answer, the player is requested to choose between two envelopes which are displayed on the screen, whereby only one of these envelopes contains a shopping voucher, m) after choosing the envelope containing the shopping voucher, the player is requested to provide personal details, such as his postal code and date of birth, and n) printing a winning certificate for the player after this information has been provided.

2. Method in accordance with claim 1, wherein the display informs the player that the game is over after an incorrect answer has been chosen.

3. Method in accordance with claim 1, wherein the display informs the player that the game is over after the wrong envelope has been chosen.

4. Method in accordance with claim 3, wherein the display informs the player that the game is over, should it be established on the basis of his personal details that the player is playing on this device for the fourth time within a certain time period.

5. Method in accordance with claim 4, wherein the display informs the player that the game is over, should it be evident on the basis of the player's personal details that he is not of the required minimum age.

6. Method in accordance with claim 5, wherein the sequence of at least one of the short films and the advertising spots is preset.

7. Method in accordance with claim 1, wherein at least one of the sequence, the insertion of the quiz question, and quiz questions in between at least one of the short films and advertising spots is preset.

8. Method in accordance with claim 1, wherein on request, at least one of calling cards and letter heads are printed out after entry of the correct answer.

* * * * *